May 22, 1934.  W. T. ELLINGTON ET AL  1,959,661
DISHWASHING MACHINE
Filed Sept. 23, 1930  2 Sheets-Sheet 1
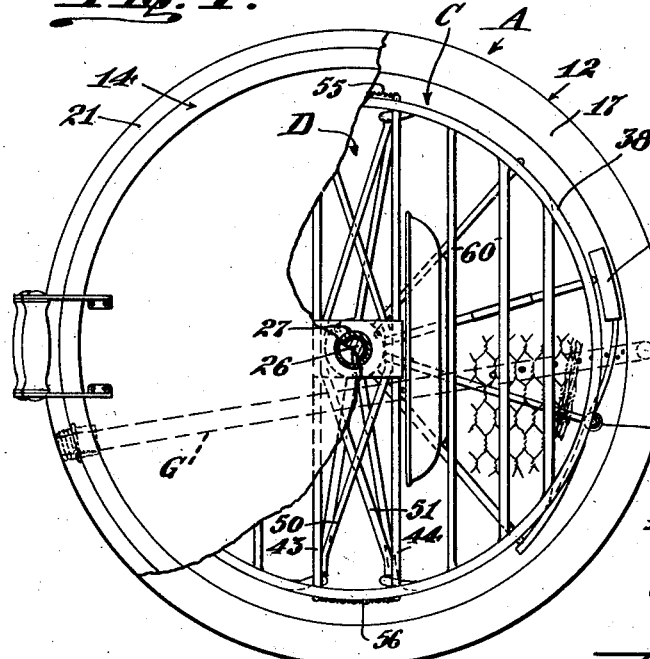
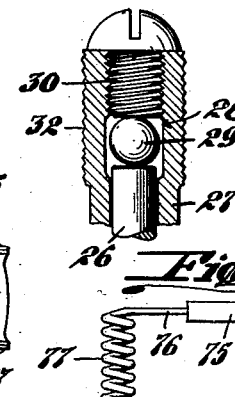
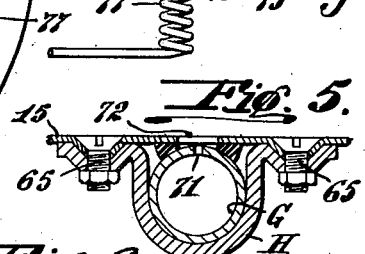
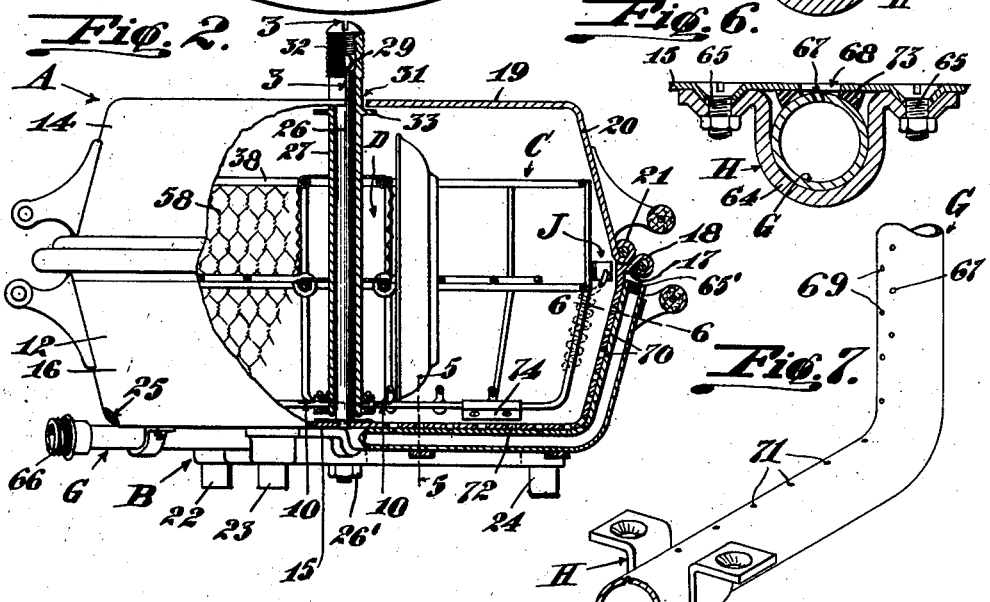
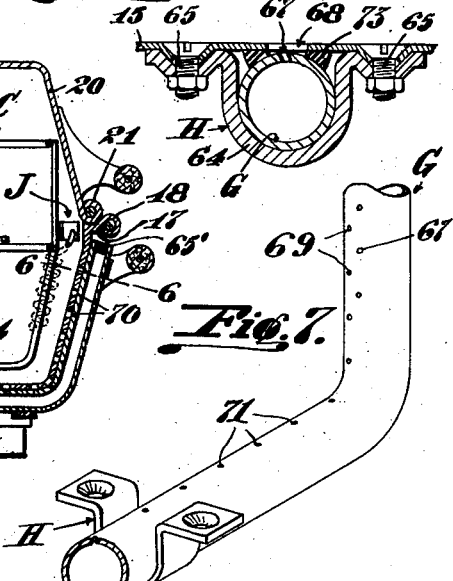
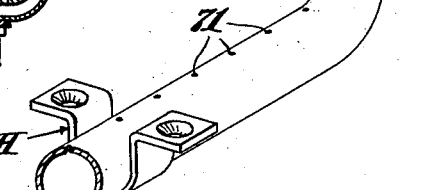
Inventors
William T. Ellington
and Richard G. Manifold
By R. S. Burg
Atty.

May 22, 1934.  W. T. ELLINGTON ET AL  1,959,661
DISHWASHING MACHINE
Filed Sept. 23, 1930  2 Sheets-Sheet 2
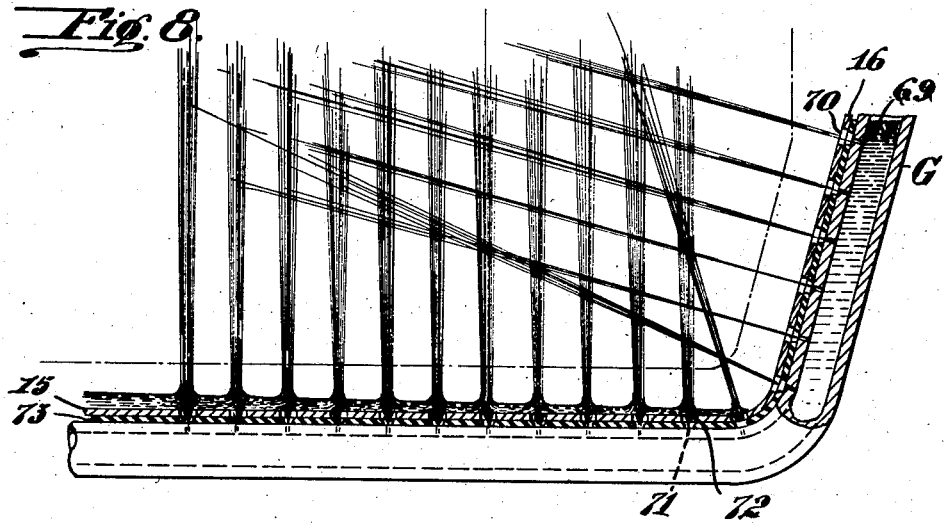
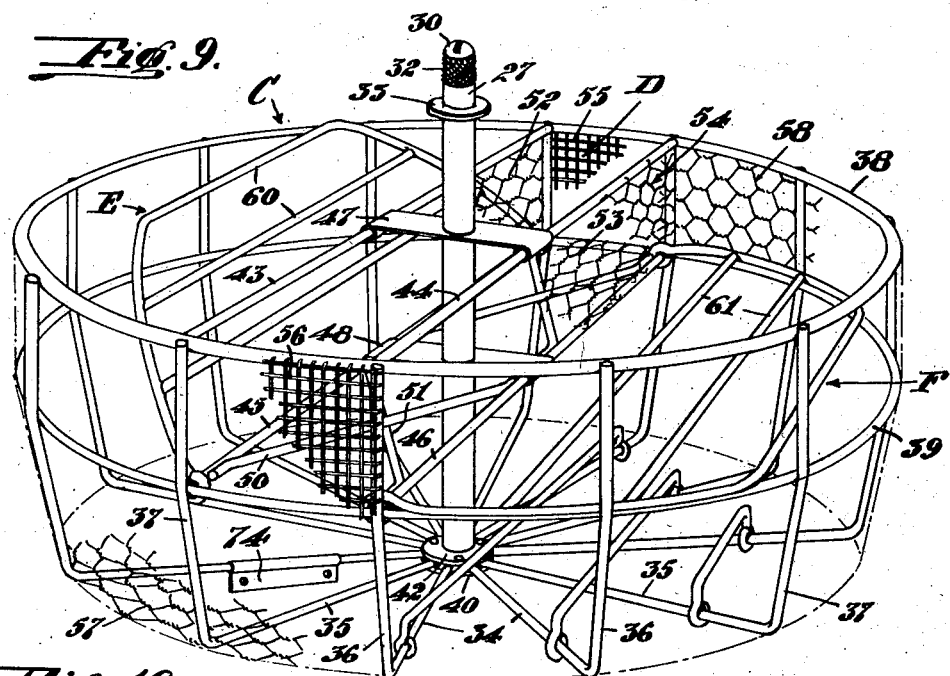
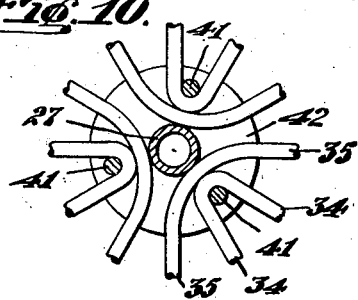
Inventors:
William T. Ellington
and Richard G. Manifold
By R. S. Birch
Atty.

Patented May 22, 1934

1,959,661

UNITED STATES PATENT OFFICE 1,959,661

DISHWASHING MACHINE

William T. Ellington and Richard G. Manifold, Los Angeles, Calif., assignors to General Engineering Corporation, Ltd., Los Angeles, Calif., a corporation of California Application September 23, 1930, Serial No. 483,838

10 Claims. (Cl. 141—9)

This invention relates to a dish washing machine of the type in which a dish carrying basket is revolubly mounted within a housing and in which rotation of the basket and washing of articles carried by the basket are effected by the action of streams of liquid directed against and through the walls of the basket and against the contents of the basket; the invention herein set forth being related to that disclosed in a pending application for Letters Patent, filed December 9, 1930, Serial Number 501,030.

An object of the invention is to provide a dish washing machine of the above character in which the washing action may be rapidly and thoroughly accomplished with the employment of a minimum of the washing fluid.

Another object is to provide a construction and arrangement whereby the streams of liquid may be directed into the basket through the walls of the housing so as to obviate obstructions interiorly of the housing which might interfere with the rotation of the basket and whereby the basket and housing may be formed to closely conform to each other and thereby economize space.

Another object is to provide means whereby rotation of the basket at excessive speeds will be prevented and whereby rotation of the basket will be effected at such slow speed as to insure proper washing of the contents thereof; it being found in practice that dishwashing machines of this type are frequently inefficient because of the dish container being revolved at such high speed that the streams are not allowed to impact on the dishes with sufficient force and length of time to effect their maximum cleansing action.

Another object is to provide a bearing for the revoluble dish carrying basket which is so formed as to offer but slight resistance to the starting of rotary movement of the basket, and which will afford a minimum of frictional resistance to rotation of the basket during operation.

Another object is to provide a mounting for the basket which will permit of ready removal of the latter from its encompassing housing and also facilitate its assemblage therein.

Another object is to provide a simple construction whereby the basket may be effectively enclosed in its housing and whereby discharge of liquid from the housing during the washing operation will be prevented except through an outlet provided for the purpose.

Another object is to provide a means whereby rotation of the basket may be manually started, retarded or stopped, and whereby the speed of rotation of the basket while enclosed in its housing may be readily ascertained from the exterior of the latter, thereby enabling an attendant to determine whether or not the washer is properly functioning.

Another object is to provide a dish washer which is so formed and constructed as to permit of ready positioning of dishes and utensils therein and their removal therefrom, and whereby the articles to be washed may be so disposed and arranged within the carrier or receptacle therefor as to be most effectively presented to the incoming streams of washing liquid.

Another object is to provide a dish and utensil carrying basket for washing machines of open construction which is so formed as to have adequate strength combined with desired lightness in weight, and whereby distortion of the basket under the loads to which it is ordinarily subjected will be obviated.

A further object is to provide a means whereby streams or jets of liquid projected upwardly into the dish carrying basket will be caused to pass through a body of liquid previously delivered to the housing enclosing the basket whereby the force of the streams or jets will cause portions of such body of liquid to be carried upwardly therewith, thus in effect employing the liquid repeatedly and thereby effecting economy in the consumption of the washing fluid.

With the foregoing objects in view, together with such other objects and advantages as may subsequently appear, the invention resides in the parts and in the combination, construction and arrangement of parts hereinafter described and claimed and illustrated by way of example in the accompanying drawings, in which:—

Fig. 1 is a plan view of the washing machine with parts broken away;

Fig. 2 is a view of the washing machine as seen in side elevation partly in vertical section;

Fig. 3 is a detail in section as seen on the line 3—3 of Fig. 2 showing the bearing for the revoluble basket;

Fig. 4 is a view in elevation of a centrifugally operated brake employed to prevent excessive speed of rotation of the basket, showing it as detached;

Fig. 5 is a view in cross section taken on the line 5—5 of Fig. 2;

Fig. 6 is a detail in cross section taken on the line 6—6 of Fig. 2;

Fig. 7 is a detail in perspective illustrating a fragmentary portion of a liquid supply conduit employed in the machine, showing it as detached;

Fig. 8 is a view in section and elevation illustrating the manner in which streams of washing fluid are directed into the dishwasher;

Fig. 9 is a perspective view of the dish and utensil basket with parts broken away;

Fig. 10 is a view in section and elevation as seen on the line 10—10 of Fig. 2, showing the manner of forming the lower central portion of the basket.

Referring to the drawings more specifically, A indicates generally the housing of the washing machine which is here shown as comprising a lower section or basin 12 and a top section or cover 14; the basin comprising a circular pan having a bottom wall 15 and an upwardly and an outwardly inclined annular side wall 16 which latter is formed with an outwardly projecting marginal flange 17 formed with a concave upper face and terminating in a rolled rim 18. The cover 14 is in the form of an inverted pan and includes a top wall 19 and a downwardly and outwardly inclined side wall 20 terminating in a rolled rim 21 adapted to seat on the concave upper face of the flange 17 contiguous the inner margin of the rim 18 of the basin 12. The basin is carried on a base B formed with a series of three legs 22, 23, and 24 which constitute a tripod support for the housing, the leg 24 having a length slightly greater than that of the legs 22 and 23 whereby the bottom wall 15 of the basin will be inclined to the horizontal when the base B is disposed on a horizontal supporting surface. The basin 12 is formed with a drain outlet 25 at the intersection of the lower portion of the inclined bottom 15 with the side wall 16. Projecting upwardly from the bottom wall 15 centrally thereof, is a fixed cylindrical standard 26, the lower end portion of which passes through the wall 15 and through the base B and is engaged by a nut 26'. Demountably carried on said standard is a revoluble dish and utensil carrying basket C which includes a wire frame hereinafter more fully described, and which is carried on a sleeve 27 open at its lower end and adapted to be positioned around the standard 26 in slidable telescoping relation thereto. The upper end portion of the sleeve 27 is formed with annular internal recess 28 in which is positioned a single ball bearing 29 having a diameter slightly greater than the internal diameter of the sleeve 27 and accordingly exceeding the diameter of the standard, whereby the ball 29 will be prevented from passing downwardly through the sleeve 27 when the latter is removed from the standard 26.

The recess 28 in the upper end of the sleeve 27 is closed by a screw 30 threaded therein, the lower end of which constitutes a bearing surface and between which and the upper end of the standard 26, the ball 29 is interposed as shown in Fig. 3 to afford a single ball bearing support for the basket C. The upper end of the standard 26 is flat, as is the lower end of the screw 30, so as to afford a minimum of contact between these surfaces and the ball 29, thereby producing a bearing which will offer little frictional resistance to rotation of the basket around the standard. The ball 29 is of a diameter less than that of the recess 28 so as to permit free rotation of the ball or turning of the sleeve relatively thereto, and is of a diameter exceeding that of the interior portion of the sleeve encompassing the standard, so that the ball will not pass from the recess when the sleeve is lifted on the standard or removed therefrom.

The screw 30 affords a means for adjusting the sleeve longitudinally of the standard, as by turning the screw out and in the recess the sleeve may be lowered or raised in its relation to the standard, thereby varying the position of the basket relatively to the bottom of the basin. The standard 26 and the sleeve 27 are of such length that the upper end portion of the sleeve 27 will project through an opening 31 in the top wall 19 of the cover 14 when the latter is seated on the margin of the basin 12 as shown in Fig. 2, whereby rotation of the sleeve 27 may be observed and whereby the sleeve may be grasped by the hand to effect manual rotation or stopping of rotation of the sleeve. The upper end portion of the sleeve 27 is preferably milled, as indicated at 32 to afford a surface which may be readily grasped.

As a means for preventing discharge of liquid through the opening 31, the sleeve 27 is formed with an annular flange 33 arranged to overlie a clearance space afforded between the margin of the opening 31 and the tube 27 with the flange projecting beneath the cover wall 19, as shown in Fig. 2.

The basket C, particularly shown in Fig. 9, embodies a wire framework consisting of a plurality of wire ribs 34 and 35 projecting radially from the lower end portion of the sleeve 27 to extend substantially parallel with the bottom wall 15 and having upturned end portions 36 and 37, respectively, which are affixed at their upper ends to a wire ring 38 constituting the upper margin of the basket. A second wire ring 39 is affixed intermediate the upright portions of the ribs, and is arranged interiorly thereof.

In order to afford a secure connection between the wire frame and the lower end of the sleeve 27, the latter is provided with a fixed annular flange 40 on its lower end through which is passed a series of upstanding rivets 41, and the wires forming the ribs 34 and 35 are bent intermediate their ends to pass around the rivets 41, as particularly shown in Fig. 10, the upper ends of the rivets being engaged by an annular plate 42, between which and the flange 40, the bent portions of the wire ribs 34 and 35 are clamped by the rivets 41. By this construction, a single rivet 41 serves as a connection for four radiating ribs 34 and 35.

As a means for diametrically bracing the basket to securely hold it against distortion under the loads imposed thereon, a series of transverse bars, here shown as four in number indicated at 43, 44, 45, and 46, are provided, the bars 43 and 44 being disposed on opposite sides of the sleeve 27 in spaced relation thereto, and having their ends affixed to the rim wire 38 and the bars 45 and 46 being disposed in spaced relation beneath the bars 43 and 44, and having their ends affixed to the wire ring 39. The bars 43 and 44 are connected intermediate their ends to a sheet metal plate 47 which is affixed to the sleeve 27, and the bars 45 and 46 are affixed intermediate their ends to a plate 48 connecting with the sleeve 27, the plates 47 and 48 being formed with openings through which the sleeve 27 extends. Crossed diagonal wires 50 and 51 lead from the outer end portions of the transverse bars 45 and 46 and connect to the latter intermediate their ends, thereby forming a truss diametrically of the basket.

The space bordered by the bars 43, 44, 45, and 46 is utilized as a receptacle D for utensils such as knives, forks, and spoons, and in forming such receptacle a strip of wire netting is affixed along the bar 43 and is arranged to span the space between the bars 43 and 45 to form a side wall 52 and in like manner strips of wire netting are extended across the space between the bars 45 and 46 and across the space between the bars 46 and 44 to form bottom and side walls 53 and 54, respectively. End walls 55 and 56 of the receptacle D are formed of sheets of wire netting of small mesh, which sheets are affixed to the wire rings 38 and 39 and to a pair of contiguous upstanding wire ribs 36 and 37.

The basket C has a bottom wall 57 formed of wire netting and has an annular side wall 58 also formed of wire netting, the netting being affixed to the wire ribs 34, 35, 36, and 37, and to the rim ring 38. The basket walls 57 and 58, being formed of netting, are sufficiently open to offer little obstruction to the passage of water therethrough.

The wires constituting the basket frame are secured together at their meeting points as by welding, and the wire netting constituting the walls of the basket C and of the receptacle D, is secured in place by welding in the manner common to wire basket construction.

Hinged for vertical swinging movement on the bars 45 and 46, are racks E and F, each of which includes a series of spaced parallel wires 60 and 61, respectively, and which racks normally extend horizontal with their outer margins seated on the intermediate wire ring 39, and while in this position, serve as a horizontal partition in the basket. The racks E and F afford a means for holding substantially flat dishes in an upright position while supported on the bottom wall 57 of the basket as shown in Fig. 2, and also serve as shelves for supporting cups, glasses and similar articles in an inverted position thereon, apart from other articles carried on the bottom of the basket.

An important feature of the present invention resides in a construction whereby a plurality of streams or jets of a washing liquid may be directed into the interior of the housing through the walls thereof in a manner to obviate projections interiorly of the housing and thereby afford a substantially continuous uninterrupted inner surface throughout the portions of said walls liable to be contacted by articles protruding from the basket, and which, as here shown, embodies a conduit G which extends across the under side of the bottom wall 15 of the basin 12 and projects at one end upwardly along the inclined side wall 16. The conduit is affixed to the basin 12 by means of clamps H, here shown as comprising metallic straps 64 which are passed around the conduit G and have their end portions affixed to the walls of the basin 12 as by means of bolts 65, the heads of which are countersunk in the basin walls, as shown in Figs. 5 and 6, so as not to project interiorly of the basin. The upper end of the conduit G is closed by a plug 65' and the lower end thereof is fitted with a connection 66 whereby it may be attached to a hose or other suitable conduit leading from a source of hot water supply under pressure.

The upwardly projecting portion of the conduit G is formed with a series of spaced apertures 67 leading diagonally through the conduit wall and communicating with the interior of the basin 12 from the exterior thereof through openings 68 formed in the side wall 16, as shown in Fig. 6, whereby streams of liquid emitted from the openings 67 will be directed at an upward inclination into the basket C and tangentially thereof in such a manner that on impinging against the contents of the basket C will act to effect rotation of the latter in one direction.

The upstanding portion of the conduit is also formed with a second series of openings 69 arranged to direct streams of liquid through openings 70 in the wall 16 in a direction substantially diametrical of the housing and in an upwardly inclined direction, as shown in Fig. 8. The portion of the conduit G extending from the upstanding portion thereof to contiguous the central portion of the basin is formed with a series of openings 71 arranged to direct vertical streams of liquid upwardly through openings 72 in the bottom wall 15 of the basin from the underside of said bottom wall.

As a means for preventing leakage from the openings 68, 70, and 72 in the basin walls, a seal 73 is formed in the joint between the exterior of the basin walls and the conduit G, which seal may be of any suitable character, but is here shown as comprising a rubber or rubber composition which is interposed between the conduit and the basin.

As a means for preventing too free rotation of the basket C, a blade 74 is mounted to depend from one of the radial ribs 34 or 35 to project contiguous to the bottom wall 15 of the basin so that, as the basket revolves, its movement will be retarded by the resistance imposed on the blade 74 by liquid contained in the basin and extending over the bottom thereof.

Means are also provided for automatically limiting the speed of the rotation of the basket, here shown as comprising a centrifugally operated brake J which includes a weighted brake shoe 75 fixed on an arm 76, affixed to a coil spring 77 carried on one of the upright ribs 37, and which shoe 75 is normally held out of contact with the side wall of the basin 12 by action of the spring 77. The brake shoe is adapted to be advanced into frictional engagement with the side wall of the basin under the action of centrifugal force developed by rotation of the basket.

The brake shoe being normally out of contact with the side walls of the housing, permits free starting of rotation of the basket, but on being frictionally engaged with the housing side walls under the action of centrifugal force will act to retard rotation of the basket to limit the speed thereof; the brake being designed to prevent rotation of the basket at a speed exceeding that at which most efficient washing action is effected.

In the operation of the invention, the housing A is positioned on a suitable support, such as a drain board or sink, with the basin 12 disposed so that the bottom wall 15 thereof is inclined downwardly toward the drain outlet 25, and after the dishes and utensils to be washed are placed in the basket C, the cover is set in place on the basin whereupon heated water under pressure is directed through the conduit G, as through a connection leading from a faucet in a hot water supply system. Streams of water will then be projected into the housing A through the several series of nozzle openings 67, 69, and 71, as before described, and by reason of the streams directed from the diagonal nozzle 67 impinging on the basket and its contents in tangential relation to the basket, the latter will be caused to revolve around the standard 26, thereby subjecting the contents of the basket to the washing action of the several series of streams which will be directed thereagainst as the basket revolves. In event the force of the diagonal streams is not sufficient to start rotation of the basket, the upper end of the sleeve 27 may be grasped by the hand and given a twist such as to start the basket in motion.

The discharge outlet 25 is of such area as not to permit free discharge of the liquid from the basin so that a shallow volume of the liquid will extend over the bottom wall of the basin through which the blade 74 will pass, thereby effecting a retarding action on the rotation of the basket. This layer of liquid will extend over the upwardly opening nozzles 71 so that the streams directed therethrough will act to elevate portions of the liquid previously accumulated on the bottom of the basin thus increasing the volume of the upwardly projected streams and in effect reusing a portion of the liquid previously delivered to the housing and thus economizing the use of the washing liquid. In event the force of the diagonal or tangential streams is such as to impart to the basket an excessive rotational speed, the brake 75 will come into action and limit the speed of the rotation of the basket as before described.

By the construction set forth, the interior of the housing A is rendered free of obstructions which might interfere with the rotation of the basket, such as might be ocassioned by portions of utensils protruding through the side walls of the basket sufficiently far as to contact the walls of the basin.

On completion of the washing action, which ordinarily occurs within a few moments, the source of water supply is cut off and the basket allowed to revolve under its momentum, thereby effecting a drying action on the contents thereof, such liquid as may be contained in the basin on cutting off the supply thereto being quickly discharged therefrom through the outlet 25. By constructing the bearing of the basket as herein set forth, its rotary motion under momentum, will continue for a considerable time after the motivating stream has been cut off. In event it is desired to stop rotation of the basket, this may be effected by manually grasping the upper end portion of the stem 27.

After completion of the washing action, the cover 14 is removed by merely lifting it from its seated position on the basin, thus giving access to the basket C and its contents, and if desired the basket may be removed from the basin previous to removal of its contents by lifting the stem 27 out of engagement with the standard 26.

While we have shown and described herein a specific form of carrying out the invention, we do not limit ourselves to the exact construction, arrangements and embodiments here shown, but may employ such changes as occasion may require coming within the meaning and scope of the appended claims.

We claim:

1. A dish washing machine comprising a basin formed with a drain outlet, a standard erected from the bottom of said basin, a sleeve revolubly supported on said standard, a dish supporting basket fixed on said sleeve and revoluble therewith, means for directing streams of washing liquid against said basket and its contents to effect a washing action on the contents of the basket and to impart a rotary motion to the basket, and means on said basket acting on liquid extending over the bottom of said basin for impeding rotation of said basket and sleeve.

2. In a dish washing machine, a basin, a cover therefor formed with an opening, a standard carried by said basin, a sleeve revolubly supported on said standard projecting through said opening, a flange on said sleeve extending beneath said opening and overlapping the margins thereof contiguous thereto, a dish supporting basket fixed to said sleeve, and means for directing streams of washing liquid against said basket and the contents thereof to effect a washing action on the contents of the basket and to impart rotary motion to said basket and sleeve.

3. In a dish washing machine, a housing, a dish carrying basket revolubly mounted therein, means for directing streams of liquid against said basket and its contents to effect rotation of said basket and, also to wash the contents thereof, and a centrifugally operated brake shoe carried by said basket movable to frictionally engage said housing for limiting the speed of rotation of said basket.

4. In a dish washing machine, a basin, a cylindrical standard erected from the bottom of said basin, a sleeve loosely encircling said standard, a basket carried by said sleeve, said sleeve having an enlarged internal recess in the upper portion thereof, a ball arranged in said recess to seat on the upper end of said standard, said ball having a diameter less than that of said recess to afford a clearance between said ball and said sleeve, and exceeding that of the inner lower portion of said sleeve and a bearing carried by said sleeve seating on said ball.

5. In a dish washing machine, a basin including a side wall having a series of apertures formed therein, and a liquid conduit extending along said side wall exteriorly thereof having nozzle openings communicating with said apertures, a revoluble basket in said basin, said nozzle openings including a series of openings arranged to direct streams of liquid tangentially of said basket and a series of openings arranged to direct streams of liquid radially of said basket, said tangential streams serving to effect rotation of said basket, means cooperating with liquid accumulated in said basin for retarding rotation of the basket, and friction means for limiting the speed of rotation of said basket.

6. In a dish washing machine, a basin, a cylindrical standard in said basin having a flat upper end face, a sleeve loosely encircling said standard, a basket carried by said sleeve, said sleeve having an enlarged internal recess in the upper portion thereof of a diameter exceeding that of said standard, a screw threaded into said recess having a flat lower end face, and a ball interposed between the flat faces of said standard and screw and contacting therewith, said ball having a diameter less than that of said recess and exceeding that of the inner lower portion of said sleeve.

7. In a dish washing machine, a housing including a side wall, a dish carrying basket revolubly mounted therein, means for directing streams of liquid against said basket and its contents to effect rotation of said basket and also to wash the contents thereof, and a weighted brake shoe movably carried by said basket adapted to move into frictional engagement with the side wall of said housing under action of centrifugal force.

8. In a dish washing machine, a basin having a bottom wall formed with a series of apertures, a liquid supply pipe having discharge outlets communicating with said apertures beneath the plane of the top surface of said bottom wall, and a restricted drain outlet in said basin arranged to cause the accumulation of a shallow volume of liquid over said bottom wall.

9. In a dish washing machine, a basin having a bottom wall and a side wall, each of which is formed with a series of apertures with the apertures in the bottom wall extending substantially in alinement with the apertures in the side wall, a fluid supply pipe secured exteriorly of the basin and bent to conform to the cross sectional contour of the bottom and side walls, said pipe having a series of discharge outlets communicating with the apertures in said walls, and an apertured deformable sealing strip clamped between said pipe and said walls with the apertures thereof in registration with the apertures in said pipe and said walls.

10. In a dish washing machine, a basin having a bottom wall and a side wall formed with a series of apertures in substantial alinement, a fluid supply pipe secured exteriorly of the basin and bent to conform closely to the cross sectional contour of the bottom and side walls, said pipe having a series of apertures opening directly to the apertures in said walls and sealing means between said pipe and said walls.

WILLIAM T. ELLINGTON.
RICHARD G. MANIFOLD.